US010556290B2

United States Patent
Tao et al.

(10) Patent No.: US 10,556,290 B2
(45) Date of Patent: Feb. 11, 2020

(54) SYSTEM FOR COORDINATED STATIONARY TRACKING WITH ROOT PATH MEMORY CLOCKING FOR CYLINDRICAL WELDING

(71) Applicant: Fanuc America Corporation, Rochester Hills, MI (US)

(72) Inventors: Jianming Tao, Troy, MI (US); Bradley Niederquell, Troy, MI (US); Peter Levick, Bloomfield Hills, MI (US)

(73) Assignee: FANUC ROBOTICS AMERICA CORPORATION, Rochester Hills, MI (US)

( * ) Notice: Subject to any disclaimer, the term of this patent is extended or adjusted under 35 U.S.C. 154(b) by 610 days.

(21) Appl. No.: 14/946,879

(22) Filed: Nov. 20, 2015

(65) Prior Publication Data

US 2017/0144256 A1   May 25, 2017

(51) Int. Cl.
  *B23K 9/00*    (2006.01)
  *B23K 9/127*   (2006.01)

(52) U.S. Cl.
  CPC .................................. *B23K 9/1272* (2013.01)

(58) Field of Classification Search
  CPC ............ B23K 2201/06; B23K 37/0276; B23K 37/0282; B23K 37/053; B23K 9/0282; B23K 9/048
  USPC ................................ 228/212, 44.3; 219/60 A
  See application file for complete search history.

(56) References Cited

U.S. PATENT DOCUMENTS

| | | | | |
|---|---|---|---|---|
| 4,468,741 A | * | 8/1984 | Simonton | G05B 19/41815 228/58 |
| 4,659,903 A | * | 4/1987 | Berne | B23K 9/032 219/125.11 |
| 5,624,588 A | * | 4/1997 | Terawaki | B23K 9/1272 219/124.34 |
| 5,826,655 A | * | 10/1998 | Snow | E21B 43/24 166/272.3 |
| 6,492,618 B1 | * | 12/2002 | Flood | B23K 9/0286 219/125.11 |

* cited by examiner

*Primary Examiner* — Erin B Saad
(74) *Attorney, Agent, or Firm* — John A. Miller; Shumaker, Loop & Kendrick, LLP (57) ABSTRACT

A method for performing coordinated stationary tracking during a welding operation performed on a cylindrical part includes mounting a cylindrical part on a rotating arm having a central rotational axis and directing a welding torch to a weld position wherein the welding torch is directed toward an initial weld joint position. The rotating arm is rotated about the central rotational axis thereof to provide relative movement between the cylindrical part and the welding torch when the welding torch is positioned at the weld position. During the rotating of the rotating arm the welding torch remains substantially stationary while a tracking sensor of the welding robot periodically determines geometric information of the cylindrical part based on a rotational position of the rotating arm. The geometric information regarding the cylindrical part is then used to determine vertical and lateral offsets to be applied to the welding torch relative to the weld position.

20 Claims, 3 Drawing Sheets

SYSTEM FOR COORDINATED STATIONARY TRACKING WITH ROOT PATH MEMORY CLOCKING FOR CYLINDRICAL WELDING

FIELD OF THE INVENTION

The present invention relate to a robot system configured to perform a method of coordinated stationary tracking for a welding operation on a cylindrical part.

BACKGROUND

Robotic automated welding of cylindrical parts has become increasingly common. Current methods of welding the cylindrical parts rely on coordinated motion between a welding robot and a positioner robot configured to position and rotate the cylindrical part. Due to inconsistencies in a geometry of the cylindrical part or a misalignment during the mounting of the cylindrical part to the positioner robot, it is common for a welding operation performed on the cylindrical part to be tracked in a manner wherein offsets to be applied to the path of the welding operation to compensate for the variations in the part geometry. These offsets often require relatively small movements of the welding robot, often leading to an instance of welding robot draft in each of a travel direction and a lateral direction of the welding operation.

One method of tracking the weld joint position may include a stationary tracking process. One problem present in traditional stationary tracking processes is that in the absence of coordinated motion the stationary tracking process cannot provide a relative motion speed between the tracking device and the object being tracked. In the case of the welding of a cylindrical part rotated about its rotational axis, a move time of the welding robot and a rotational speed of the positioner robot must each be specified prior to the welding operation to achieve a desired relative travel speed for the welding operation. This requirement adds difficulty and time to the setup of the welding process. Additionally, each time a new cylindrical part having a different geometry is mounted to the positioner robot the robot move time and the rotational speed of the positioner robot must be recalculated once again.

To solve this problem a method of coordinated stationary tracking may be employed. One known method includes positioning the welding torch of the welding robot at a specified position relative to the cylindrical part from which the tracking is to occur. During the initial pass of the welding robot the cylindrical part is tracked and the determined offsets to be applied to the welding robot are stored to memory relative to the base of the welding robot. However, this process results in a situation where each subsequent welding pass will have to start and stop at the same position relative to the base of the welding robot because the offsets are stored relative to the base of the welding robot. This problem severely limits the use of this method of stationary tracking when multiple welding passes are required and especially when at least some of the additional passes are staggered relative to each other.

It would therefore be desirable to provide a method of stationary coordinated tracking that allows for the offsets to be applied during the welding operation to be determined relative to the geometry of the cylindrical part to be welded and not relative to a base of the welding robot.

SUMMARY

In accordance with the present invention, a method for performing coordinated stationary tracking for a welding operation performed on a circumferentially extending weld joint formed on an outer circumferential surface of a cylindrical part is disclosed. The method comprises the steps of: mounting the cylindrical part on a rotating arm of a positioner robot, the rotating arm configured to rotate about a central rotational axis thereof; determining a position of an initial weld joint location on the weld joint using a tracking sensor disposed on a welding robot; positioning a welding torch of the welding robot to a first weld position wherein the welding torch is directed toward the position of the initial weld joint location; and determining on a periodic basis a translational offset to be applied to the welding torch relative to the first weld position for application during the welding operation on the weld joint, wherein each periodic determination of the translational offset occurs during a rotation of the rotating arm and is associated with a corresponding rotational position of the rotating arm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Additionally, the dimensions provided in the drawings are merely for purposes of explaining the invention, and are not necessary or critical to operation of the invention unless otherwise stated herein. In respect of the methods disclosed, the steps presented are exemplary in nature, and thus, the order of the steps is not necessary or critical.

Figure 1:
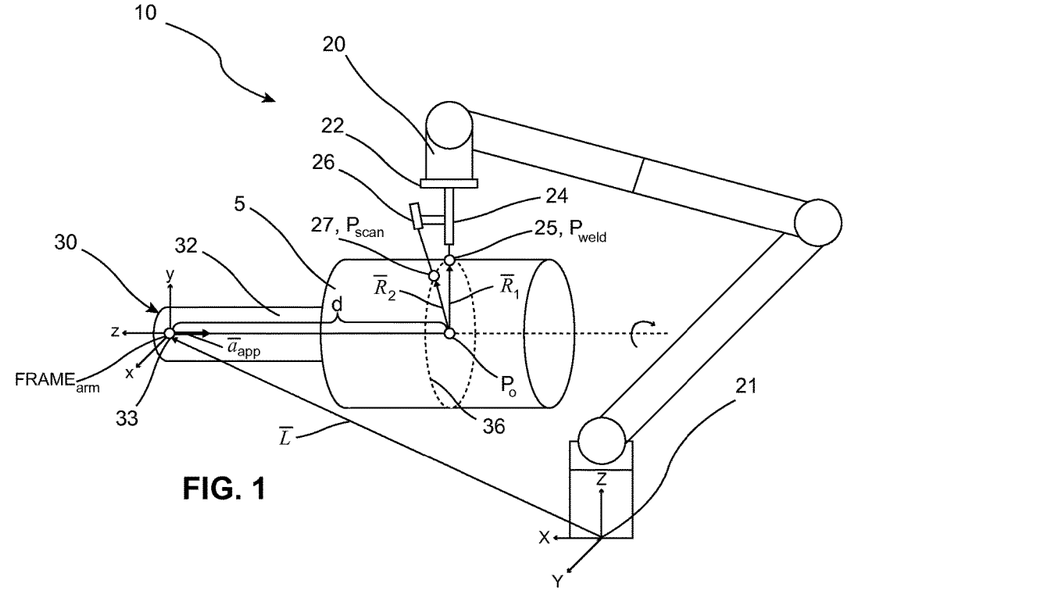
FIG. 1 is a schematic view of a robotic system including a positioner robot and a welding robot configured to perform a welding operation on a cylindrical part according to a method of the invention.

FIG. 1 illustrates a robotic welding system 10 for performing a method of coordinated stationary tracking according to the present disclosure. The robotic welding system 10 comprises a welding robot 20 and a positioner robot 30. The welding robot 20 is configured to perform a welding operation on a cylindrical part 5 (pipe) configured for mounting on the positioner 30.

Figure 2:
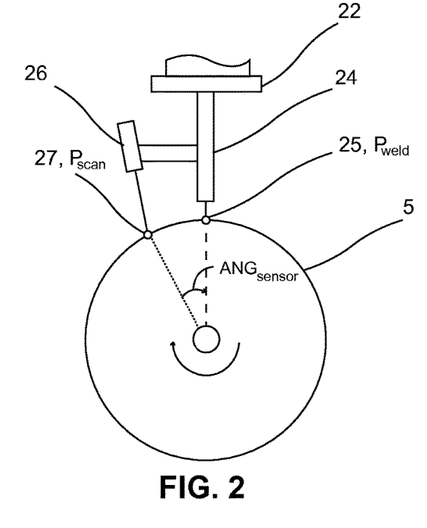
FIG. 2 is a fragmentary side elevational view illustrating a relationship between a welding torch and a sensor of the welding robot relative to the cylindrical part.

The welding robot 20 includes a robot base 21 and a robot faceplate 22. The robot base 21 forms a stationary coordinated frame of the welding robot 20 and the robot faceplate 22 forms a linkage of the welding robot 20 configured for the mounting of a welding torch 24 thereto. As shown in FIG. 2, the welding torch 24 is mounted to the robot faceplate 22 in a manner wherein the welding torch 24 has a fixed relationship with respect to the robot faceplate 22. The welding torch 24 is directed toward a weld joint location 25. A tracking sensor 26 is mounted to one of the robot faceplate 22 or the welding torch 24 in a manner wherein the tracking sensor 26 also has a fixed relationship with respect to each of the robot faceplate 22 and the welding torch 24. The tracking sensor 26 is directed toward a scan point 27. The tracking sensor 26 may be a laser sensor configured to track and detect geometric information of a targeted article within an optical frame of the tracking sensor 26, but any suitable tracking sensor 26 capable of determining a location of a desired point on a working part relative to a position and orientation of the sensor may be used without departing from the scope of the present invention.

The robot faceplate 22 has a known kinematic relationship to the robot base 21 based on the type of welding robot and a known condition of each joint of the welding robot 20 formed between the robot base 21 and the robot faceplate 22. For example, a welding robot comprised of revolute joints will have a known kinematic relationship between the robot base 21 and the robot faceplate 22 based on parameters such as the length of each linkage, the lateral offset formed between each adjacent pair of linkages, and the joint angle formed between each adjacent pair of linkages, as a non-limiting example. Accordingly, any suitable welding robot 20 having the requisite degrees of freedom and reach to attain a desired position and orientation for performing a welding operation on the cylindrical part 5 may be used without departing from the scope of the present invention.

The positioner 30 may be a single axis or multi-axis robot having a rotating arm 32. The rotating arm 32 includes a joint 33 formed at one end thereof. The rotating arm 32 further includes a central rotational axis extending through the joint 33 and in a longitudinal direction of the rotating arm 32. If the positioner 30 is a single axis robot, the joint 33 defines a fixed base position of the positioner 30 and the single axis of the positioner 30 is the central rotational axis of the rotating arm 32. Accordingly, a position of the robot base 21 relative to the joint 33 of the positioner 30 is known based on an installed position of the base of each of the welding robot 20 and the positioner 30. Alternatively, if the positioner 30 is a multi-axis robot, a position of the joint 33 and an orientation of the rotating arm 32 may be determined based on the model of the positioner 30 and a determination of the joint condition of each joint of the positioner 30 formed between a base of the positioner and the rotating arm 32.

The cylindrical part 5 may be any form of cylindrical part 5 suitable for mounting on the positioner 30. The cylindrical part 5 may be comprised of two or more segments configured to be coupled to each other by a welding operation or the cylindrical part 5 may comprise a single segment having a joint in need of a welding operation, as non-limiting examples. The cylindrical part 5 may include an outer surface having an indicator such as a geometric feature or a form of surface indicia formed thereon for determining a position of the initial weld joint location 25. For example, the indicator may be a portion of a circumferentially extending weld joint 36 formed between two or more of the segments forming the cylindrical part 5 and the initial weld joint location 25 is disposed on the weld joint 36. Accordingly, the tracking sensor 26 may be configured to locate a position of the indicator to determine a position of the initial weld joint location relative to the optical frame of the tracking sensor 26. Because the cylindrical part 5 is intended to be rotated about the central rotational axis of the rotating arm 32, the welding operation is performed on the cylindrical part 5 in a substantially circumferential direction of the cylindrical part 5. Accordingly, the tracking sensor 26 is further configured to track the desired seam or joint as it extends in a circumferential direction of the cylindrical part 5 from the initial position of the desired seam or joint.

The robotic system 10 further includes at least one controller (not shown) configured to control the robotic system 10 in accordance with the method according to the disclosure. Each controller may communicate with one or more of the welding robot 20 and the positioner 30 using any known method. Each controller may further include or communicate with a memory source in the form of a non-transitory storage media (not shown) for storing information associated with the robotic system 10 and the cylindrical part 5 and a processor configured to carry out any required computations for performing the method according to the disclosure, including the calculations required for determining the relevant relationships between the welding robot 20, the positioner 30, and the cylindrical part 5 during a welding operation.

The robotic system 10 may be used to perform a method of coordinated stationary tracking between the positioner 30 and the welding robot 20 to perform a welding operation. The method includes a step of calibrating the positioner 30 relative to the robot base 21 to establish a kinematic relationship between the welding robot 20 and the positioner 30. A kinematic relationship between the robot base 21 and the joint 33 of the rotating arm 32 is determined as $TRANS_{arm}$. As explained hereinabove, the determination of $TRANS_{arm}$ in the case of a single axis positioner 30 requires a determination of the position of each of the robot base 21 and the joint 33 as well as a determination of the orientation of the rotating arm 32 relative to the joint 33. In the case of a multi-axis positioner 30, the determination of $TRANS_{arm}$ may further include a determination of the condition of each joint of the positioner 30 formed between the base thereof and the rotating arm 32. Once $TRANS_{arm}$ has been established for the type and current condition of the positioner 30, a frame of the rotating arm 32, denoted as $FRAME_{arm}$, may be determined by determining an angular position of the rotating arm 32 about the central rotational axis thereof, which may be denoted as $ANG_{arm}$. The relationship between $FRAME_{arm}$, $TRANS_{arm}$, and $ANG_{arm}$ is accordingly as follows:

$$FRAME_{arm} = TRANS_{arm} :: ANG_{arm}$$

The frame $FRAME_{arm}$ is illustrated in FIG. 1. The $FRAME_{arm}$ includes a z-axis extending parallel to and in alignment with the central rotational axis of the rotating arm 32, originating from the joint 33, and extending in a direction away from the cylindrical part 5 mounted to the rotating arm 32. The direction of the z-axis of the $FRAME_{arm}$ is established with reference to a direction of rotation of the rotating arm 32, as shown in FIG. 1. An approach vector $\overline{\alpha}_{app}$ of the frame $FRAME_{arm}$ extends from the joint 33 in the negative direction of the z-axis of the frame $FRAME_{arm}$ toward the cylindrical part 5 mounted to the rotating arm 32. Additionally, a translation vector $\overline{L}$ extending from the robot base 21 to the joint 33 of the rotating arm 32 may similarly be determined using the known conditions of the positioner 30 relative to the robot base 21.

Following the calibration step, the method further includes a step of mounting the cylindrical part 5 to the rotating arm 32 of the positioner 30. The method of mounting the cylindrical part 5 on the rotating arm 32 may vary dependent on the type of positioner 30 and the geometry of the cylindrical part 5. A central rotational axis of the cylindrical part 5 is preferably aligned with the central rotational axis of the rotating arm 32 of the positioner 30. However, as explained hereinafter, a misalignment of the cylindrical part 5 relative to the rotating arm 32 is addressed by means of the method of coordinating stationary tracking performed by the robotic system 10.

Following the mounting of the cylindrical part 5 to the positioner 30, the method according to the disclosure further includes a step of sensing and determining a position of an initial weld joint location 25, hereinafter denoted as $P_{weld}$, relative to the base 21 of the welding robot 20. As explained hereinafter, $P_{weld}$ also acts as the stationary tracking point used during the method of coordinated stationary tracking. The sensing of $P_{weld}$ first includes positioning the robot faceplate 22 of the welding robot 20 adjacent the mounted cylindrical part 5 in a manner wherein the optical frame of the tracking sensor 26 is directed toward the cylindrical part 5 to locate $P_{weld}$ by sensing the geometric or visual indicator formed on the cylindrical part 5. For example, the tracking sensor 26 may be configured to determine geometric or visual information indicating the presence of a circumferentially extending joint formed between two cylindrical segments comprising the cylindrical part 5.

A known kinematic relationship between the robot faceplate 22 and the optical frame of the sensor 26 is determined as $FRAME_{sensor}$. A position of $P_{weld}$ relative to the optical frame of the sensor 26 is determined as $P_{sensor\text{-}frame}$. A kinematic relationship between the robot base 21 and the robot faceplate 22 is determined as $TRANS_{faceplate}$. Accordingly, the position of $P_{weld}$ relative to the robot base 21 is determined as follows:

$$P_{weld} = TRANS_{faceplate} :: FRAME_{sensor} :: P_{sensor\text{-}frame}$$

Figure 3:
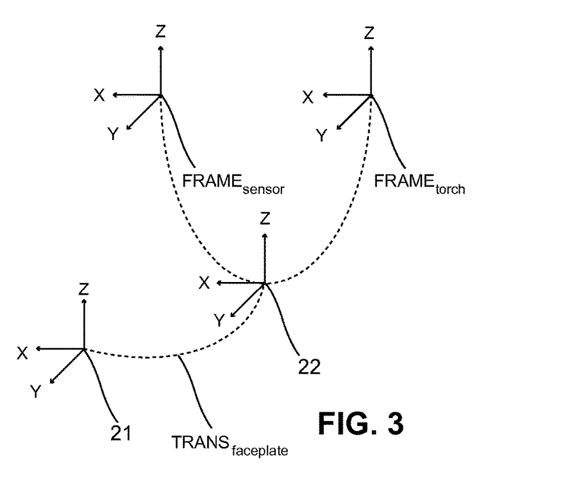
FIG. 3 is a schematic view illustrating a kinematic relationship between a base of the welding robot and the welding torch and the sensor of the welding robot.

Furthermore, a known kinematic relationship between the robot faceplate 22 and a frame of the welding torch 24 is determined as $FRAME_{torch}$. Because the position and orientation of the welding torch 24 relative to the robot base 21 is also known, the welding torch 24 may be positioned adjacent $P_{weld}$ at a desired orientation and distance from $P_{weld}$ to begin a welding operation. FIG. 3 summarizes the kinematic relationships formed between the robot base 21, the robot faceplate 22, the welding torch 24, and the optical frame of the sensor 26.

With renewed reference to FIG. 2, the welding torch 24 is spaced apart from the sensor 26 in a manner wherein a leading distance exists therebetween. The leading distance causes $P_{weld}$ to be spaced apart from the scan position 27 on the cylindrical part 5 at which the tracking sensor 26 is directed, herein denoted as $P_{scan}$, by a portion of a circumference of the cylindrical part 5. A rotational angle separating $P_{weld}$ from $P_{scan}$ relative to a center of the cylindrical part 5 is determined as $ANG_{sensor}$, which is fixed when the cylindrical part 5 has a constant radius and the orientation of the welding torch 24 relative to the cylindrical part 5 is also fixed. The rotational angle $ANG_{sensor}$ may be determined by first positioning the welding torch 24 to be directed toward the desired $P_{weld}$. When the welding torch 24 is directed toward $P_{weld}$, the sensor 26 is activated to indicate $P_{scan}$ on the cylindrical part 5. The location of $P_{scan}$ is then marked on the cylindrical part 5 and a rotational joint angle of the rotating arm 32 is recorded. For example, the rotational joint angle of the rotating arm 32 may initially be set to 0 degrees. Next, the rotating arm 32 of the positioner 30 is rotated until the marked position on the cylindrical part 5 is positioned immediately beneath the welding torch 24 to cause the welding torch 24 to be directed toward the marked position. When at this position, the rotational joint angle of the rotating arm 32 is again recorded and the difference between the two recorded rotational joint angles determines the value of $ANG_{sensor}$.

A coordinated motion between the welding robot 20 and the positioner 30 may then be performed once $P_{weld}$ weld has been determined relative to the robot base 21. Preferably, the welding torch 24 may be maintained at an absolutely stationary position relative to the robot base 21 while also maintaining a constant distance from the cylindrical part 5 during rotation of the rotating arm 32. However, in many instances the welding torch 24 may not be maintained at this stationary position relative to the cylindrical part 5 due to variations in the position of the weld joint 36 relative to a center of rotation of the rotating arm 32. For example, the central rotational axis of the cylindrical part 5 may not be perfectly aligned with the central rotational axis of the rotating arm 32. In other instances, the cylindrical part 5 may include various surface inconsistencies or manufacturing defects that cause the cylindrical part 5 to have an inconsistent radius relative to the central rotational axis thereof. Still, in other instances the cylindrical part 5 may intentionally be formed to have a non-uniform radius or shape in need of a welding operation. In all such instances, it may not be possible to retain the welding torch 24 in an absolutely stationary position relative to the robot base 21 during rotation of the cylindrical part 5 as the misalignment of the cylindrical part 5 or the inconsistent radius of the cylindrical part 5 may cause the resulting weld seam to be offset from the position of the desired weld seam.

Accordingly, the method of coordinated stationary tracking further includes a step of determining a tracking frame of the welding operation, hereinafter denoted as $FRAME_{track}$, for determining translational offsets to be applied to a position of the welding torch 24 in response to a detected variation in a geometry of the cylindrical part 5. $FRAME_{track}$ is determined by comparison of the position and orientation of the welding torch 24 relative to the position and orientation of the central rotational axis of the rotating arm 32 of the positioner 30. When the cylindrical part 5 is rotated about the central rotational axis of the rotating arm 32 a travel direction of the welding operation is always tangential to the outer surface of the cylindrical part 5 and therefore perpendicular to the central rotational axis of the rotating arm 32. The perpendicular relationship formed between the travel direction of the welding operation and the central rotational axis of the rotating arm 32 allows for the position and orientation of the welding torch 24 to be used to define the orientation of $FRAME_{track}$.

Figure 4:
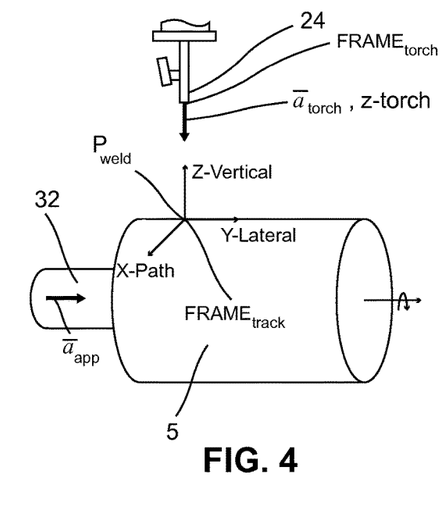
FIG. 4 is a fragmentary perspective view illustrating a method of determining a tracking frame according to the method of the invention when the welding torch of the welding robot is oriented perpendicular to central rotational axis of the positioner robot.
Figure 5:
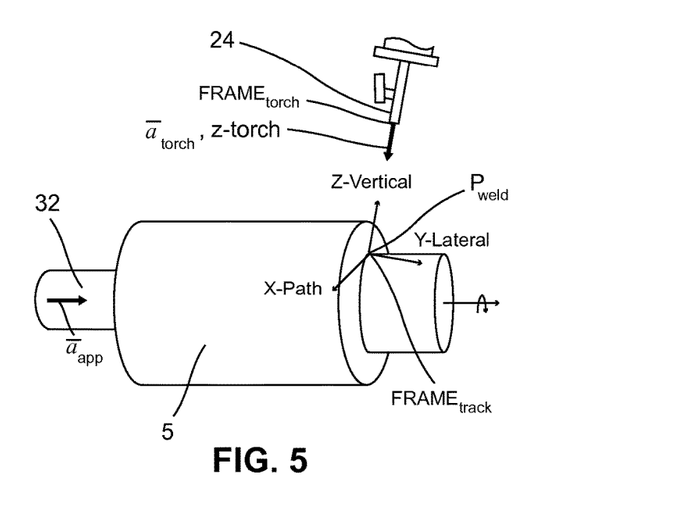
FIG. 5 is a fragmentary perspective view illustrating a method of determining a tracking frame according to the method of the invention when the welding torch of the welding robot is oriented at an acute angle relative to the central rotational axis of the positioner robot.

First, the $FRAME_{torch}$ of the welding torch 24 is determined relative to the robot base 21 using the known conditions of the joints of the welding robot 20 when the welding torch 24 is directed toward $P_{weld}$. As illustrated in FIGS. 4 and 5, a unit vector $\bar{\alpha}_{torch}$ of $FRAME_{torch}$ extends in a positive z-direction of $FRAME_{torch}$ toward $P_{weld}$. The unit vector $\bar{\alpha}_{torch}$ is then crossed with the unit vector $\bar{\alpha}_{app}$ extending along the central rotational axis of the rotating arm 32 to obtain an X-path unit vector direction of $FRAME_{track}$. The X-path unit vector is accordingly perpendicular to each of the central rotational axis of the rotating arm 32 and the unit vector $\bar{\alpha}_{torch}$ of the welding torch 24 and extends parallel to the travel direction of the welding operation during rotation of the rotating arm 32. As shown in FIGS. 4 and 5, $P_{weld}$ forms the origin of the tracking frame. A Z-vertical unit vector of $FRAME_{track}$ is oriented in alignment with the unit vector $\bar{\alpha}_{torch}$ of the welding torch 24 but extends in an opposite direction. A Y-lateral unit vector of $FRAME_{track}$ may be determined by crossing the Z-vertical unit vector with the X-path unit vector. Together, the Z-vertical unit vector, the X-path unit vector, and the Y-lateral unit vector form an orthogonal coordinate tracking frame suitable for coordinated stationary tracking.

FIG. 4 illustrates a situation where the Y-lateral unit direction extends parallel to the central rotational axis of the rotating arm 32 and the Z-vertical direction extends perpendicular to the central rotational axis of the rotating arm 32. This configuration occurs when the welding torch 24 is oriented perpendicular to the central rotational axis of the rotating arm 32. In contrast, FIG. 5 illustrates a situation where the welding torch 24 is oriented at an acute angle relative to the central rotational axis of the rotating arm 32, causing the Y-lateral direction to also be oriented at an acute angle relative to the central rotational axis of the rotating arm 32. Accordingly, $FRAME_{track}$ may be determined even when the welding torch 24 is not oriented perpendicular to the central rotational axis of the rotating arm 32 or the outer surface of the cylindrical part 5.

Following the determination of $FRAME_{track}$, the method of coordinated stationary tracking further includes a step of determining the translational offsets to be applied to the welding torch 24 in each of the Z-vertical direction and the Y-lateral direction of $FRAME_{track}$ to maintain a desired position of the welding torch 24 relative to the cylindrical part 5 during rotation of the rotating arm 32. A translational offset is not calculated in the X-path direction as the rotation of the rotating arm 32 and hence the cylindrical part 5 provides a relative motion between the cylindrical part 5 and the welding torch 24 in the welding path direction that does not require a translational offset. The position and orientation of the central rotational axis of the rotating arm 32 is independent of a condition of the welding robot 20, hence the vertical offset can be calculated relative to a rotational center of the rotating arm 32 and in terms of the angular position $ANG_{arm}$ of the rotating arm 32.

As explained hereinabove, the step of scanning to locate $P_{weld}$ within the optical frame of the tracking sensor 26 allows for an initial position of each of $P_{weld}$ and $P_{scan}$ to be determined relative to the robot base 21. The determination of $P_{weld}$ is performed when the rotating arm 32 is at the known angular position $ANG_{arm}$. For example, the initial angular position $ANG_{arm}$ of the rotating arm 32 during the scanning and location of $P_{weld}$ may be 0 degrees, wherein rotation through one half revolution of the rotating arm 32 would correspond to an angular position $ANG_{arm}$ of 180 degrees. In contrast to the fixed position $P_{weld}$, the position $P_{scan}$ is periodically monitored by the tracking sensor 26 during rotation of the rotating arm 32 and hence the cylindrical part 5 by periodically determining a position of the desired weld joint 36 relative to the optical frame of the tracking sensor 26. As such, each incremental measurement of $P_{scan}$ during rotation of the rotating arm 32 corresponds to a known angular position $ANG_{arm}$ of the rotating arm 32.

A position of a rotational center $P_o$ of the rotating arm 32 is also fixed throughout the coordinated stationary tracking operation and is not dependent on a condition of the welding robot 20. A determination of a position of the rotational center $P_o$ requires a determination of $FRAME_{arm}$ to establish a position and an orientation of the approach vector $\bar{\alpha}_{app}$. Accordingly, with renewed reference to FIG. 1, the position of the rotational center $P_o$ is based on the following relationship:

$$P_o = \bar{L} + \bar{\alpha}_{app} * d$$

where d represents a known translation distance extending from the joint 33 to the center of rotation $P_o$ along the central rotational axis of the rotating arm 32.

A position of the center of rotation $P_o$ is then compared to a position of $P_{weld}$ to determine a translational vector $\bar{R}_1$ extending from $P_o$ to $P_{weld}$. The translational vector $\bar{R}_1$ is arranged perpendicular to the central rotational axis of the rotating arm 32. The vector $\bar{R}_1$ has a length $L_1$ representing a radius of the cylindrical part 5 extending from the center of rotation $P_o$ to the outer surface of the cylindrical part 5 at $P_{weld}$. A position of the center of rotation $P_o$ is then also compared to a position of the current $P_{scan}$ to determine a translational vector $\bar{R}_2$ extending from $P_o$ to $P_{scan}$. The vector $\bar{R}_2$ has a length $L_2$ representing a radius of the cylindrical part 5 extending from the center of rotation Po to the outer surface of the cylindrical part 5 at the current $P_{scan}$. The translational offset in the Z-vertical direction of $FRAME_{track}$, hereinafter denoted as $OFFSET_{Z-track}$, may accordingly be determined as follows:

$$OFFSET_{Z-track} = L_1 - L_2$$

The $OFFSET_{Z-track}$ is calculated as a difference between the radius of the cylindrical part 5 as measured from $P_o$ to $P_{weld}$ and the radius of the cylindrical part 5 as measured from $P_o$ to $P_{scan}$ for a given rotational position $ANG_{arm}$ of the rotating arm 32. The initial calculation of the $OFFSET_{Z-track}$ is determined at the known initial angular position $ANG_{arm}$, such as 0 degrees. The rotating arm 32 and therefore the cylindrical part 5 is then rotated through any desired angular displacement, such as a full revolution, to continuously determine the $OFFSET_{Z-track}$ at a reasonable angular interval about a desired portion of a circumference of the cylindrical part 5. Accordingly, each determination of $P_{scan}$ and therefore $OFFSET_{Z-track}$ is stored with reference to a known angular position $ANG_{arm}$ of the rotating arm 32. As explained hereinabove, $P_{weld}$ is angularly spaced apart from $P_{scan}$ relative to the center of rotation $P_o$ about a circumference of the cylindrical part 5 by $ANG_{sensor}$. Accordingly, $ANG_{sensor}$ must also be accounted for when generating the coordinated stationary tracking program, as the $ANG_{sensor}$ corresponds to an angular offset that exists between the determined angular position $ANG_{arm}$ of the rotating arm 32 during each determination of the $\text{OFFSET}_{Z\text{-}track}$ and the eventual angular position $\text{ANG}_{arm}$ of the rotating arm 32 when the welding operation is to be applied at $P_{weld}$.

The translational offset in the Y-lateral direction, denoted hereinafter as $\text{OFFSET}_{Y\text{-}track}$, may then be determined for any given angular position $\text{ANG}_{arm}$ of the rotating arm 32 by the following relationship:

$$\text{OFFSET}_{Y\text{-}track} = \overline{R}_2 \cdot \overline{\alpha}_{app}$$

In situations where the vector $\overline{R}_2$ is arranged perpendicular to the central rotational axis of the rotating arm 32, and hence the approach vector $\overline{\alpha}_{app}$, the dot product between the vector $\overline{R}_2$ and the approach vector $\overline{\alpha}_{app}$ is zero, resulting in no translational offset in the Y-lateral direction. In contrast, a situation where the vector $\overline{R}_2$ is arranged at a non-perpendicular angle relative to the approach vector $\overline{\alpha}_{app}$ will result in a translational offset in the Y-lateral direction. In similar fashion to the $\text{OFFSET}_{Z\text{-}track}$, the $\text{OFFSET}_{Y\text{-}track}$ is determined independent of a condition of the welding robot 20.

The $\text{OFFSET}_{Y\text{-}track}$ is continuously monitored and associated with a specific angular position $\text{ANG}_{arm}$ of the rotating arm 32 in similar fashion to the $\text{OFFSET}_{Z\text{-}track}$. Accordingly, the $\text{OFFSET}_{Z\text{-}track}$ and the $\text{OFFSET}_{Y\text{-}track}$ for each measured angular position $\text{ANG}_{arm}$ of the rotating arm 32 may be stored as being associated with each measured angular position $\text{ANG}_{arm}$.

Following determination of the $\text{OFFSET}_{Z\text{-}track}$ and the $\text{OFFSET}_{Y\text{-}track}$, each translational offset must be converted from being determined relative to the tracking frame to being determined relative to the robot base 21 according to the current condition of the welding robot 20. The translational offset in the Z-vertical direction relative to the robot base 21, hereinafter denoted as $\text{OFFSET}_{Z\text{-}robot}$, is determined by the following relationship:

$$\text{OFFSET}_{Z\text{-}robot} = \text{OFFSET}_{Z\text{-}track} \cdot \overline{a}_{torch}$$

Similarly, the translational offset in the Y-lateral direction relative to the robot base 21, hereinafter denoted as $\text{OFFSET}_{Y\text{-}robot}$, is converted from being determined relative to the tracking frame to being determined relative to the robot base 21 of the welding robot 20. $\text{OFFSET}_{Y\text{-}robot}$ is determined by the following relationship:

$$\text{OFFSET}_{Y\text{-}robot} = \text{OFFSET}_{Y\text{-}track} \cdot \overline{y}$$

where $\overline{y}$ is the unit vector in the Y-lateral direction of the $\text{FRAME}_{track}$ determined relative to the robot base 21.

The total translational offset to be applied to the position of the welding torch 24 relative to the robot base 21, hereinafter denoted as $\text{OFFSET}_{total}$, is determined by the following relationship:

$$\text{OFFSET}_{total} = \text{OFFSET}_{Z\text{-}robot} + \text{OFFSET}_{Y\text{-}robot}$$

Figure 6:
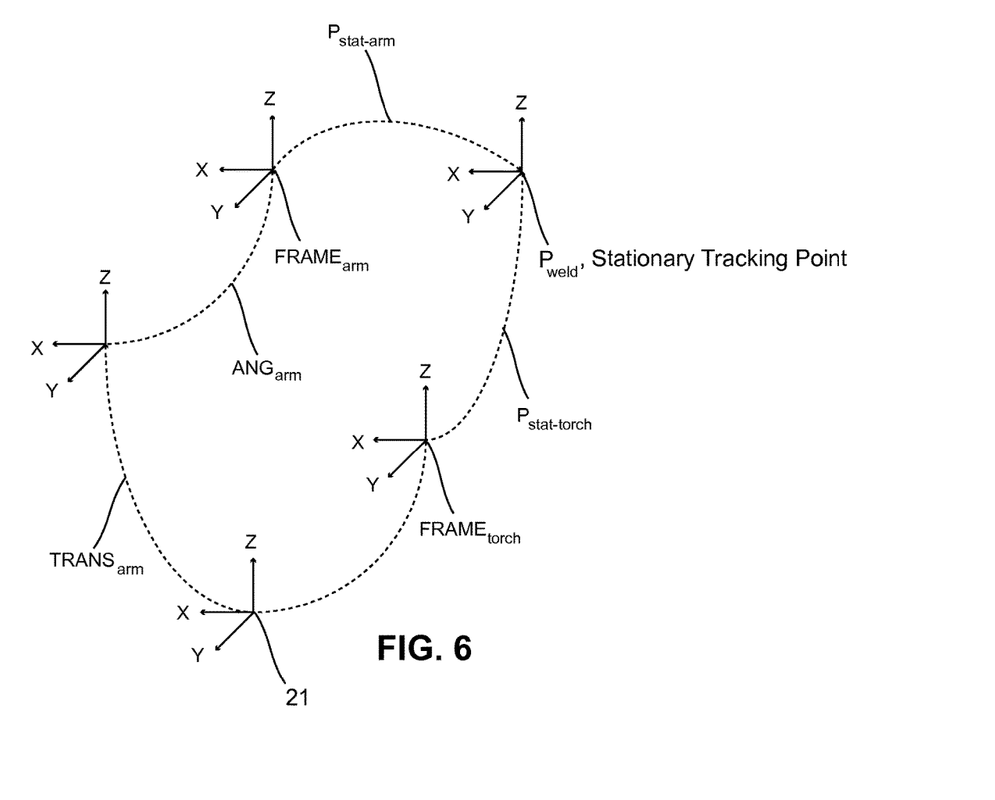
FIG. 6 is a schematic view illustrating the kinematic relationships between the robot base, the welding robot, and the positioner robot according to the method of the invention.

During the method of coordinated stationary tracking the $\text{OFFSET}_{total}$ relative to the robot base 21 must then be converted to the $\text{FRAME}_{arm}$ in order to produce a correct compensation of the welding torch 24 at the stationary tracking point corresponding to $P_{weld}$. Referring now to FIG. 6, the kinematic relationships between the welding robot 20, the positioner 30, and the stationary tracking point corresponding to $P_{weld}$ are shown. The following relationship is then determined:

$$\text{TRANS}_{arm} :: \text{ANG}_{arm} :: P_{stat\text{-}arm} = \text{FRAME}_{torch} :: P_{stat\text{-}torch}$$

where $P_{stat\text{-}torch}$ is a fixed position of the stationary tracking point with respect to $\text{FRAME}_{torch}$, $\text{ANG}_{arm}$ is continuously updated during a rotation of the rotating arm 32, and $P_{stat\text{-}arm}$ is a position of the stationary tracking point with respect to $\text{FRAME}_{arm}$. The $P_{stat\text{-}arm}$ is continuously updated based on the coordinated motion between the welding robot 20 and the positioner 30. As such, let $\text{OFFSET}_{arm\text{-}frame}$ be a required offset in the $\text{FRAME}_{arm}$ that is able to produce a desired offset relative to the robot base 21, hereinafter denoted as $\text{OFFSET}_{robot\text{-}base}$. Based on these circumstances, the following kinematic equation may be derived:

$$\text{TRANS}_{arm} :: \text{ANG}_{arm} :: \text{OFFSET}_{arm\text{-}frame} :: P_{stat\text{-}arm} = \text{OFFSET}_{robot\text{-}base} :: \text{FRAME}_{torch} :: P_{stat\text{-}torch}$$

Therefore, the $\text{OFFSET}_{arm\text{-}frame}$ in the $\text{FRAME}_{arm}$ can be obtained as follows:

$$\text{OFFSET}_{arm\text{-}frame} = (\text{TRANS}_{arm} :: \text{ANG}_{arm})^{-1} :: \text{OFFSET}_{robot\text{-}base} :: \text{FRAME}_{torch} :: P_{stat\text{-}torch} :: (P_{stat\text{-}arm})^{-1}$$

Thus, all relevant offsets have been calculated relative to each of $\text{FRAME}_{torch}$ and $\text{FRAME}_{arm}$ and a coordinated stationary tracking program regarding the current welding operation may be generated.

The method of coordinated stationary tracking may include both a root tracking pass and one or more additional welding passes. The root tracking pass is configured to store all relevant information regarding the geometry of the cylindrical part 5 and hence the appropriate translational offsets to be applied during a welding operation thereof relative to the angular position $\text{ANG}_{arm}$ of the rotating arm 32. First, the robot faceplate 22 is brought adjacent the cylindrical part 5 to allow the sensor 26 to locate the desired position of $P_{weld}$, which is thereby fixed relative to the robot base 21. Next, the welding torch 24 is positioned adjacent $P_{weld}$ and the sensor 26 further senses the geometric information of the cylindrical part 5 to discover a location of the desired weld joint 36 displaced from $P_{weld}$ on the cylindrical part 5 by the lead angle $\text{ANG}_{sensor}$, thereby determining the position of the initial $P_{scan}$. The position of $P_o$ is already known based on the known kinematic relationship of the positioner 30 relative to the robot base 21 and the determination of $P_{weld}$ relative to the robot base 21, hence the calculation of each translational offset may be determined for the initial determination of $P_{scan}$ relative to the robot base 21. This initial $P_{scan}$ corresponds to a known angular position $\text{ANG}_{arm}$ of the rotating arm 32 about its central rotational axis. For example, the root tracking pass may begin wherein the rotating arm 32 has not been rotated from an initial position thereof causing the angular position $\text{ANG}_{arm}$ of the rotating arm 32 to be 0 degrees. All relevant offset data is stored to the storage media of the robotic system 10 and is associated with the corresponding instantaneous angular position $\text{ANG}_{arm}$ of the rotating arm 32.

Once the initial determination of $P_{weld}$ and $P_{scan}$ has occurred and the welding torch 24 is directed toward $P_{weld}$, the welding torch 24 is maintained in a position wherein the welding torch 24 does not translate in a direction parallel to a travel direction of the welding operation formed by the relative movement of the cylindrical part 5 rotating relative to the welding torch 24. In other words, the welding torch 24 does not move laterally in a direction perpendicular to each of the orientation of the welding torch 24 and the central axis of rotation of the rotating arm 32. The rotating arm 32 and hence the cylindrical part 5 may then be rotated a desired angle about the central rotational axes thereof, such as a full revolution, while the tracking sensor 26 periodically monitors the geometric information of the cylindrical part 5 to periodically discover each subsequent position of $P_{scan}$ (based on a periodic determination of a position of the weld joint 36 relative to the robot base 21 by means of the optical frame of the tracking sensor 26) to determine the translational offsets to be applied during a welding operation of that portion of the cylindrical part 5 underlying each corresponding determination of $P_{scan}$. The determination of all relevant information may occur at any suitable sensing interval, as desired. The periodically monitored information is then stored to the storage media of the robotic system 10 in sequential order relative to the angular position $ANG_{arm}$ of the rotating arm 32. The stored information then associates the determined $OFFSET_{Z-track}$ and the determined $OFFSET_{Y-track}$ for each angular position $ANG_{arm}$ of the rotating arm 32 corresponding to each determination of $P_{scan}$. The translational offsets to be applied during a welding of the cylindrical part 5 are accordingly determined relative to a geometry of the cylindrical part 5 based on the angular position $ANG_{arm}$ of the rotating arm 32 and not on a position of the welding robot 20 relative to the cylindrical part 5.

The root track pass may be performed to discover all of the relevant information regarding the cylindrical part 5 in the absence of a welding operation or the root tracking pass may include a welding operation. Any time a welding operation occurs the offset angle $ANG_{sensor}$ must be taken into account when determining the timing of the application of the translational offsets to be applied to the welding torch 24. For example, if the offset angle $ANG_{sensor}$ is equal to 10 degrees, the cylindrical part 5 and the rotating arm 32 must be rotated through an angle of 10 degrees before the corresponding $P_{scan}$ for which the translational offsets were determined is underlying the welding torch 24. Accordingly, the offset angle $ANG_{sensor}$ must be determined and stored to the storage medium of the robotic system 10 during any welding operation to ensure that the translational offsets are applied to the welding torch 24 with the proper timing.

During the welding operation the welding torch 24 does not translate laterally in the travel direction of the welding operation during the rotation of the rotating arm 32 and hence the cylindrical part 5. Based on a determination of $ANG_{sensor}$ and the corresponding translational offsets stored to memory and associated with each angular position $ANG_{arm}$ of the rotating arm 32, the welding torch 24 may then be dynamically translated a desired distance in the Y-lateral and Z-vertical directions relative to the $FRAME_{track}$ to adjust a position of the welding torch 24 to follow the path of the weld joint 36 while maintaining the welding torch 24 at a desired distance from the cylindrical part 5. Because the welding torch 24 is not translated in the X-path direction of the $FRAME_{track}$, a relative speed of the welding operation may be determined in terms of the radius of the cylindrical part 5 and the rotational speed of the rotating arm 32. Additionally, the method of stationary coordinated tracking further ensures that the welding torch 24 does not draft in a direction parallel to the travel direction of the welding operation relative to the outer surface of the cylindrical part 5.

Figure 7:
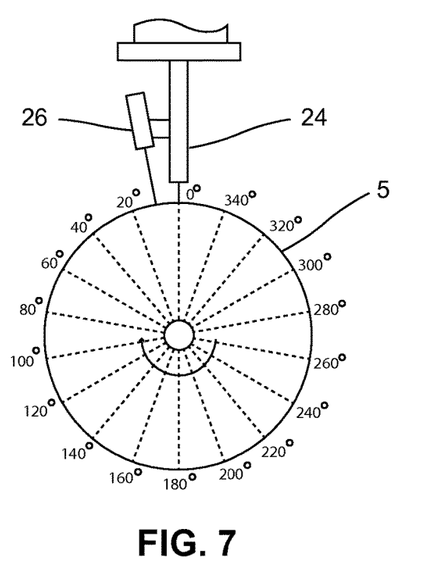
FIG. 7 is a fragmentary side elevational view illustrating a first position of the cylindrical part relative to a stationary position of the welding torch.
Figure 8:
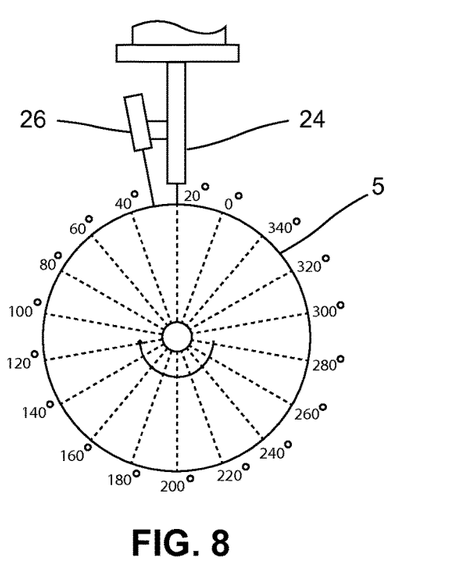
FIG. 8 is a fragmentary side elevational view illustrating a second position of the cylindrical part relative to a stationary position of the welding torch.

The method according to the invention further supports for multiple welding passes to be applied to the cylindrical part 5 using the information stored to memory during the root tracking pass. The multiple welding passes may occur in one of three ways. First, each pass, including the root tracking pass and each subsequent pass, may be performed with the welding torch 24 remaining substantially stationary at the original stationary tracking point while the rotating arm 32 is rotated about its central rotational axis to place the desired portions of the cylindrical part 5 under the welding torch 24. For example, with reference to FIG. 7, the welding torch 24 remains at a 12:00 o'clock position (arranged at an uppermost surface of the cylindrical part 5) during the root tracking pass and the welding operation begins at a position on an outer circumferential surface of the cylindrical part 5 indicated as 0 degrees. Following the root tracking pass and the accumulation of all information regarding the geometry of the cylindrical part 5, the cylindrical part 5 may then be clocked by rotation of the rotating arm 32 to a desired position for a second welding operation to be performed. For example, with reference to FIG. 8, the welding torch 24 remains at the 12:00 o'clock position while the cylindrical part 5 is clocked by 20 degrees to position the welding torch 24 adjacent a new initial welding position relative to the cylindrical part 5, which is indicated as a circumferential position of 20 degrees on the outer circumferential surface of the cylindrical part 5. The controller of the robotic system 10 then determines the proper translational offsets to be applied to the welding torch 24 at the circumferential position indicated as 20 degrees by referencing the stored information associated with this portion of the circumferential surface of the cylindrical part 5, where the determination of the translational offsets to be applied is based on both a determination of the angular position $ANG_{arm}$ at which the translational offsets were determined and an adjustment by the lead angle $ANG_{sensor}$ separating each detected geometry from the welding torch 24.

Figure 9:
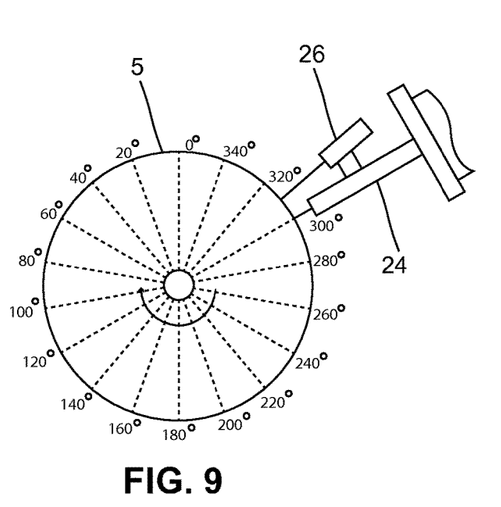
FIG. 9 is a fragmentary side elevational view illustrating a first position of the welding torch relative to an initial rotational position of the cylindrical part.
Figure 10:
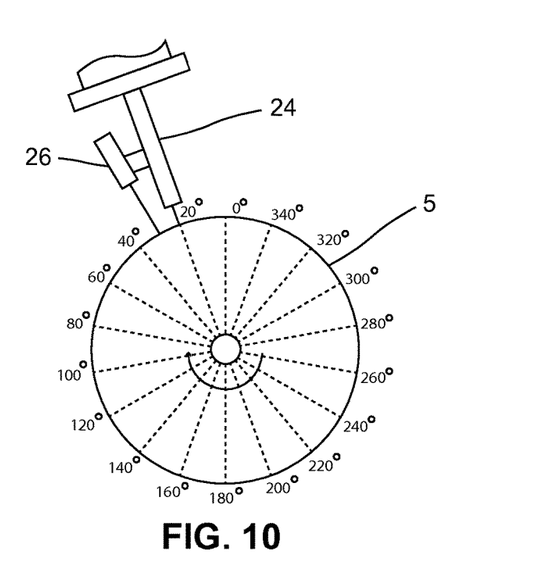
FIG. 10 is a fragmentary side elevational view illustrating a second position of the welding torch relative to an initial rotational position of the cylindrical part.

A second method of performing multiple welding passes may include varying the position of the welding torch 24 relative to the robot base 21 from the root tracking pass to each subsequent pass. For example, with reference to FIG. 9, the root tracking pass includes the welding torch 24 at approximately a 2:00 o'clock position while the welding operation begins at a circumferential position on the cylindrical part 5 indicated as 300 degrees while the circumferential position on the cylindrical part 5 indicated as 0 degrees is located at the 12:00 o'clock position. During a subsequent pass, as shown in FIG. 10, the welding torch 24 is repositioned to an 11:20 clock position to begin the second pass at the circumferential position on the cylindrical part 5 indicated as 20 degrees while the initial position of the cylindrical part 5 is returned to the initial position of the root tracking pass wherein the circumferential position on the cylindrical part 5 indicated as 0 degrees is again located at the 12:00 o'clock position. The controller of the robotic system 10 then determines the proper translational offsets to be applied to the welding torch 24 at the position indicated as 0 degrees by referencing the stored information associated with this portion of the circumferential surface of the cylindrical part 5 while adjusting for the lead angle of $ANG_{sensor}$.

A third method of performing multiple welding passes may include varying each of the welding torch 24 initial position and the initial angular position $ANG_{arm}$ of the rotating arm 32 and hence the cylindrical part 5 during the process of carrying out each welding pass. In similar fashion to the preceding examples, the proper translational offsets to be applied to any specified portion of the outer circumferential surface of the cylindrical part 5 are determined by referencing the stored information regarding the translational offsets based on the current clock position of the welding torch 24 relative to the cylindrical part 5, the current angular position $ANG_{arm}$ of the rotating arm 32, and the offset angle $ANG_{sensor}$ used to determine the correct timing in applying the translational offsets to the welding operation.

The associating of each relevant translational offset to an angular position $ANG_{arm}$ of the rotating arm 32 in a sequential order allows for any additional passes following the root tracking pass to be carried out so long as a start position of the welding operation is determined relative to the cylindrical part 5. In other words, the translational offsets to be applied when welding any particular circumferential position on the cylindrical part 5 may easily be determined by referencing the angular position $ANG_{arm}$ at which those translational offsets were calculated while also accounting for the offset angle $ANG_{sensor}$. Once the relevant translational offsets have been determined for the desired start position, the storage medium of the robotic system 10 references the translational offsets associated with this start position and then during rotation of the rotating arm 32 each subsequent determination of the translational offsets to be applied are referenced in sequential order wherein the proper translational offsets are applied to the welding torch 24 for the specified circumferential portion of the cylindrical part 5 in need of welding during the instantaneous welding pass.

For example, during a root tracking pass the welding torch 24 is initially positioned at the 12:00 o'clock position and a portion of the circumferential surface of the cylindrical part 5 indicated as 0 degrees is also positioned at the 12:00 o'clock position. The initial angular position of the rotating arm 32 is set to 0 degrees. The rotating arm 32 is then rotated through one full revolution while each translational offset associated with each portion of the circumferential surface of the cylindrical part 5 is stored to memory with reference to the instantaneous angular position $ANG_{arm}$ of the rotating arm 32. The welding torch 24 and the portion of the cylindrical part 5 indicated at 0 degrees are returned to the 12:00 o'clock position following the full revolution and the rotating arm 32 has also been returned to the angular position $ANG_{arm}$ of 0 degrees. If the welding torch 24 were to then be clocked to a 6:00 o'clock position corresponding to a portion of the outer circumferential surface of the cylindrical part 5 indicated as 180 degrees, the translational offsets to be applied to the welding torch 24 would be associated with the translational offsets applied to the welding torch 24 when the portion of the outer circumferential surface of the cylindrical part 5 indicated as 180 degrees was disposed at the 12:00 o'clock position during the root tracking pass. A start position then is established and the sequential storage of all translational offset information allows for the rotation of the rotating arm 32 to continue while the subsequent translational offsets are applied to the welding torch 24. Alternatively, the welding torch 24 may be maintained at the 12:00 o'clock position and the rotating arm 32 may be clocked by an angular position $ANG_{arm}$ of 180 degrees to establish the same relationship and start position relative to the cylindrical part 5. Alternatively, both the welding torch 24 and the rotating arm 32 may be clocked by a desired degree to place the welding torch 24 at a known position relative to the cylindrical part 5 having a known translational offset to be applied at that position.

Accordingly, the method of coordinated stationary tracking according to the current disclosure offers many advantages over known methods. First, the manner in which the welding torch 24 is able to be maintained in a position wherein the welding torch 24 does not translate in a lateral direction parallel to the travel direction of the welding operation eliminates the occurrence of drafting in the welding torch in the travel direction. Second, the ability to maintain this relatively stationary position of the welding torch 24 also allows for a determination of the relative speed of the welding operation to easily be determined with respect to the rotation speed of the rotating arm 32 and the radius of the cylindrical part 5. Lastly, the determination of each relevant translational offset with respect to a position on the outer circumferential surface of the cylindrical part 5 allows for multiple welding passes to performed while applying the appropriate translational offsets to the welding torch 24 even when the position of the welding torch 24 relative to the cylindrical part 5 or a rotational position $ANG_{arm}$ of the rotating arm 32 are varied from one pass to another, thereby greatly simplifying the process of performing staggered welds on the same cylindrical part 5.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for performing coordinated stationary tracking for a welding operation performed on a circumferentially extending weld joint formed on an outer circumferential surface of a cylindrical part, the method comprising the steps of:
    mounting the cylindrical part on a rotating arm of a positioner robot, the rotating arm configured to rotate about a central rotational axis thereof, where the central rotation axis of the rotating arm substantially coincides with a central axis of the cylindrical part;
    determining a position of an initial weld joint location on the weld joint using a tracking sensor disposed on a welding robot;
    positioning a welding torch of the welding robot to a first weld position wherein the welding torch is directed toward the position of the initial weld joint location; and
    determining on a periodic basis a translational offset to be applied to the welding torch relative to the first weld position for application during the welding operation on the weld joint, wherein each periodic determination of the translational offset occurs during a rotation of the rotating arm and is associated with a corresponding rotational position of the rotating arm, wherein the translational offset is determined relative to a tracking frame forming an orthogonal coordinate frame having an origin at the initial weld joint location and one axis aligned with the welding torch.

2. The method according to claim 1, wherein during the welding operation the rotating arm is rotated about the central rotational axis thereof and the welding torch is not translated from the first weld position in a direction parallel to a travel direction of the welding operation.

3. The method according to claim 2, wherein during the welding operation the welding torch remains fixed relative to the first weld position with the exception of an application of each determined translational offset.

4. The method according to claim 3, wherein the application of each determined translational offset to the welding torch causes the welding torch to follow a path of the weld joint during rotation of the rotating arm.

5. The method according to claim 1, wherein the tracking frame includes a first axis aligned with the welding torch when the welding torch is positioned at the first weld position, a second axis arranged perpendicular to each of the first axis and the central rotational axis of the rotating arm, and a third axis arranged perpendicular to each of the first axis and the second axis.

6. The method according to claim 5, wherein the translational offset includes a vertical offset applied to the welding torch in a direction of the first axis of the tracking frame and a lateral offset applied to the welding torch in a direction of the third axis of the tracking frame.

7. The method according to claim 6, further including a step of converting the translational offset from being determined relative to the tracking frame to being determined relative to a base of the welding robot.

8. The method according to claim 7, wherein the vertical offset is determined relative to the base of the welding robot by multiplying a scalar value of the vertical offset determined relative to the tracking frame by a unit vector of the welding torch determined relative to the base of the welding robot and the lateral offset is determined relative to the base of the welding robot by multiplying a scalar value of the lateral offset determined relative to the tracking frame by a unit vector of the third axis of the tracking frame determined relative to the base of the welding robot.

9. The method according to claim 1, further including a step of calibrating the positioner robot to the welding robot to establish a kinematic relationship between the positioner robot and a base of the welding robot.

10. The method according to claim 9, further including a step of determining a position of a center of rotation of the rotating arm relative to the base of the welding robot.

11. The method according to claim 10, wherein the center of rotation of the rotating arm is disposed on the central rotational axis thereof and a vector extending from the center of rotation of the rotating arm to the position of the initial weld joint location is arranged perpendicular to the central rotational axis of the rotating arm.

12. The method according to claim 10, wherein the determining of the translational offset includes determining a first vector extending from the center of rotation to the position of the initial weld joint location and a second vector extending from the center of rotation to a position of a second weld joint location disposed on the weld joint and circumferentially spaced apart from the initial weld joint location.

13. The method according to claim 12, wherein the position of the second weld joint location is determined by the tracking sensor when the welding torch is in the first weld position.

14. The method according to claim 1, wherein the determining of the translational offset on a periodic basis occurs during a root tracking pass wherein the rotating arm is rotated about the central rotational axis thereof and the welding torch is not translated from the first weld position in a direction parallel to a travel direction of the welding operation.

15. The method according to claim 14, wherein each periodic determination of the translational offset is determined for a first portion of the weld joint circumferentially spaced apart on the cylindrical part from a second portion of the weld joint at which the welding torch is oriented at a time of each determination of the translational offset.

16. The method according to claim 15, wherein an offset angle is determined as a difference between the rotational position of the rotating arm when the translational offset for the first portion of the weld joint is determined and a rotational position of the rotating arm when the welding torch is oriented at the first portion of the weld joint.

17. The method according to claim 16, wherein each determined translational offset is applied to the welding torch based on the rotational position of the rotating arm and a value of the offset angle.

18. The method according to claim 14, wherein each determination of the translational offset is converted from being associated with the angular position of the rotating arm to being associated with a circumferential position on the weld joint.

19. The method according to claim 18, wherein a second pass of the welding operation following the root tracking pass includes rotating the cylindrical part to direct the welding torch toward a different circumferential position on the weld joint than a circumferential position of the initial weld joint location of the root tracking pass.

20. The method according to claim 18, wherein a second pass of the welding operation following the root tracking pass includes repositioning the welding torch to a different circumferential position on the weld joint than a circumferential position of the initial weld joint location of the root tracking pass.

* * * * *